US008018497B2

United States Patent
Muraki et al.

(10) Patent No.: US 8,018,497 B2
(45) Date of Patent: Sep. 13, 2011

(54) IMAGE PICK-UP APPARATUS HAVING STILL IMAGE ADVANCING/RETREATING MANIPULATION FUNCTION, AND METHOD AND NON-TRANSITORY COMPUTER READABLE MEDIUM THEREFOR

(75) Inventors: Jun Muraki, Hamura (JP); Kimiyasu Mizuno, Akishima (JP); Koki Dobashi, Musashino (JP)

(73) Assignee: Casio Computer Co., Ltd., Tokyo (JP)

( * ) Notice: Subject to any disclaimer, the term of this patent is extended or adjusted under 35 U.S.C. 154(b) by 382 days.

(21) Appl. No.: 12/257,622

(22) Filed: Oct. 24, 2008

(65) Prior Publication Data

US 2009/0109323 A1  Apr. 30, 2009

(30) Foreign Application Priority Data

Oct. 26, 2007 (JP) ................................ 2007-279423

(51) Int. Cl.
*H04N 5/235* (2006.01)
*H04N 5/225* (2006.01)
*H04N 5/222* (2006.01)
*H04N 3/14* (2006.01)

(52) U.S. Cl. ............. 348/221.1; 348/220.1; 348/333.12; 348/333.05; 348/311; 348/312

(58) Field of Classification Search .................. 348/362, 348/333.01, 333.02, 333.05, 333.12, 231.2, 348/297, 312, 311, 220.1, 221.1; 386/38, 386/117, 120, 121
See application file for complete search history.

(56) References Cited

U.S. PATENT DOCUMENTS

| 5,557,358 | A | 9/1996 | Mukai et al. | |
|---|---|---|---|---|
| 6,204,881 | B1* | 3/2001 | Ikeda et al. | 348/362 |
| 6,871,010 | B1* | 3/2005 | Taguchi et al. | 386/230 |
| 7,193,647 | B2 | 3/2007 | Voss et al. | |
| 2001/0055070 | A1 | 12/2001 | Watanabe | |
| 2002/0118293 | A1* | 8/2002 | Hori et al. | 348/362 |
| 2003/0206241 | A1 | 11/2003 | Serizawa et al. | |
| 2005/0057678 | A1* | 3/2005 | Fujii | 348/333.11 |

(Continued)

FOREIGN PATENT DOCUMENTS

JP    2004-064467 A    2/2004

(Continued)

OTHER PUBLICATIONS

Japanese Office Action dated Feb. 1, 2010 and English translation thereof issued in a counterpart Japanese Application No. 2007-279423.

(Continued)

*Primary Examiner* — Lin Ye
*Assistant Examiner* — Marly Camargo
(74) *Attorney, Agent, or Firm* — Holtz, Holtz, Goodman & Chick, PC

(57) ABSTRACT

A shooting operation is performed using a short exposure time at least one to obtain frame image data "A", and a shooting operation is performed a plurality of times using a long exposure time to obtain sequential frame image data "B". The image data "A" and "B" are recorded in a single file. In a moving image displaying operation, a moving image consisting of the plural pieces of frame image data "B" sequentially shot using the long exposure time is displayed. When the moving image being displayed is paused, a still image is displayed based on the frame image data "A" shot using the short exposure time.

13 Claims, 9 Drawing Sheets

U.S. PATENT DOCUMENTS

| | | |
|---|---|---|
| 2005/0083414 A1 | 4/2005 | Hidaka et al. |
| 2006/0007341 A1* | 1/2006 | Nakamura et al. ....... 348/333.05 |
| 2006/0012690 A1 | 1/2006 | Nakamura et al. |
| 2006/0203109 A1 | 9/2006 | Ono |
| 2007/0279498 A1 | 12/2007 | Nonaka |
| 2008/0186387 A1 | 8/2008 | Iwamoto et al. |
| 2009/0207278 A1* | 8/2009 | Muraki et al. ........... 348/231.99 |

FOREIGN PATENT DOCUMENTS

| | | |
|---|---|---|
| JP | 2004-200950 A | 7/2004 |
| JP | 2005-519534 T | 6/2005 |
| JP | 2005-260662 A | 9/2005 |
| JP | 2006-005681 A | 1/2006 |
| JP | 2006005681 A * | 1/2006 |
| JP | 2007-060449 A | 3/2007 |
| JP | 2007-251611 A | 9/2007 |
| JP | 2007-259156 A | 10/2007 |

OTHER PUBLICATIONS

*Related* U.S. Appl. No. 12/012,180; Inventor: Iwamoto, Kenji, et al; Filed Jan. 31, 2008; Title: "Imaging Apparatus Having Moving Image Shooting Function".

*Related* U.S. Appl. No. 12/369,887; Inventor: Muraki, Jun, et al; Filed: Feb. 12, 2009; Title: "Image Pick-Up Apparatus, Image Data Processing Apparatus, and Recording Medium".

* cited by examiner

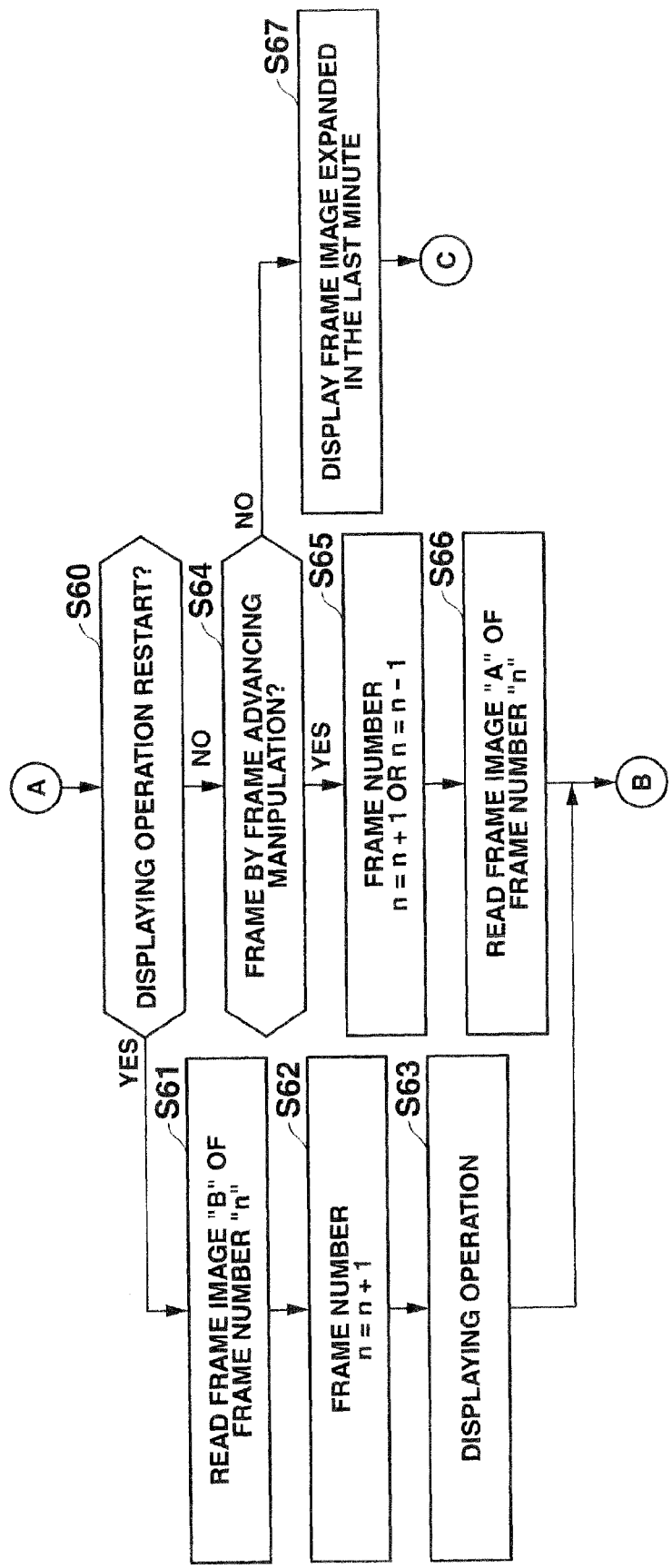

IMAGE PICK-UP APPARATUS HAVING STILL IMAGE ADVANCING/RETREATING MANIPULATION FUNCTION, AND METHOD AND NON-TRANSITORY COMPUTER READABLE MEDIUM THEREFOR

CROSS-REFERENCE TO RELATED APPLICATION

This application is based upon and claims the benefit of priority of Japanese patent application No. 2007-279423, filed Oct. 26, 2007, the entire contents of which are hereby incorporated by reference.

BACKGROUND OF THE INVENTION

1. Field of the Invention

The present invention relates to an image pick-up apparatus, and more particularly to a function of recording image data and a function of playing back image data in the image pick-up apparatus.

2. Description of the Related Art

A moving image recording technique is known, that sequentially obtains plural still images of an object each using a single exposure time, and detects a movement of the object during a period between one still image and the following still image among the plural still images of the object, and further produces from each of the plural still images a frame image of the blurred object in the direction of the movement of the object, thereby recording a moving image consisting of plural produced frame images for smooth playback.

SUMMARY OF THE INVENTION

The present invention has an object to provide a technique that is capable of recording and displaying image data suitably for displaying a still image and/or a moving image, without producing, from still images, frame images for playing a moving image.

According to one aspect of the invention, an image pick-up apparatus includes: an image pick-up unit; a shooting control unit which controls the image pick-up unit to shoot an object using a first exposure condition at least one time and to shoot the object using a second exposure condition a plurality of times, wherein the second exposure condition is different from the first exposure condition; and a recording control unit for recording the image data shot using the first exposure condition and moving image data including plural pieces of image data sequentially shot using the second exposure condition to a memory unit in association with each other.

According to another aspect of the invention, an image playback apparatus includes: an obtaining unit for obtaining plural pieces of image data, in which image data obtained by a shooting operation which is performed using a first exposure condition at least one time and moving image data including plural pieces of sequential image data obtained by a shooting operation which is performed using a second exposure condition plural times are associated with each other, wherein the second exposure condition is different from the first exposure condition; a display mode setting unit for setting a first display mode for continuously displaying the image data obtained using the first exposure condition or a second display mode for playing the moving image data obtained using the second exposure condition; and a display control unit for continuously displaying on a display the image data obtained using the first exposure condition, when the first display mode is set by the display mode setting unit, and for playing on the display the moving image data including the plural pieces of image data sequentially obtained using the second exposure condition, when the second display mode is set by the display mode setting unit.

According to a further aspect of the invention, a method of controlling a displaying operation in an image playback apparatus includes: obtaining plural pieces of image data, in which image data obtained by a shooting operation which is performed using a first exposure condition at least one time and moving image data including plural pieces of sequential image data obtained by a shooting operation which is performed using a second exposure condition plural times are associated with each other, wherein the second exposure condition is different from the first exposure condition; setting a first display mode for continuously displaying the image data obtained using the first exposure condition or a second display mode for playing the moving image data obtained using the second exposure condition; and continuously displaying on a display the image data obtained using the first exposure condition, when the first display mode is set, and playing on the display the moving image data including the plural pieces of image data sequentially obtained using the second exposure condition, when the second display mode is set.

According to still another aspect of the invention, a computer readable recording medium has a program stored thereon that is executable by a computer of an image playback apparatus to perform a process including: obtaining plural pieces of image data, in which image data obtained by a shooting operation which is performed using a first exposure condition at least one time and moving image data including plural pieces of sequential image data obtained by a shooting operation which is performed using a second exposure condition plural times are associated with each other, wherein the second exposure condition is different from the first exposure condition; setting a first display mode for continuously displaying the image data obtained using the first exposure condition or a second display mode for playing the moving image data obtained using the second exposure condition; and continuously displaying on a display the image data obtained using the first exposure condition, when the first display mode is set, and playing on the display the moving image data including the plural pieces of image data sequentially obtained using the second exposure condition, when the second display mode is set.

BRIEF DESCRIPTION OF THE DRAWINGS

FIG. 9 is a flow chart of a moving image displaying operation in the automatic selection playback mode.

DETAILED DESCRIPTION

Now, embodiments of an image pick-up apparatus of the invention, which is adopted in a digital camera will be described in detail with reference to the accompanying drawings.

A. Configuration of the Digital Camera

Figure 1:
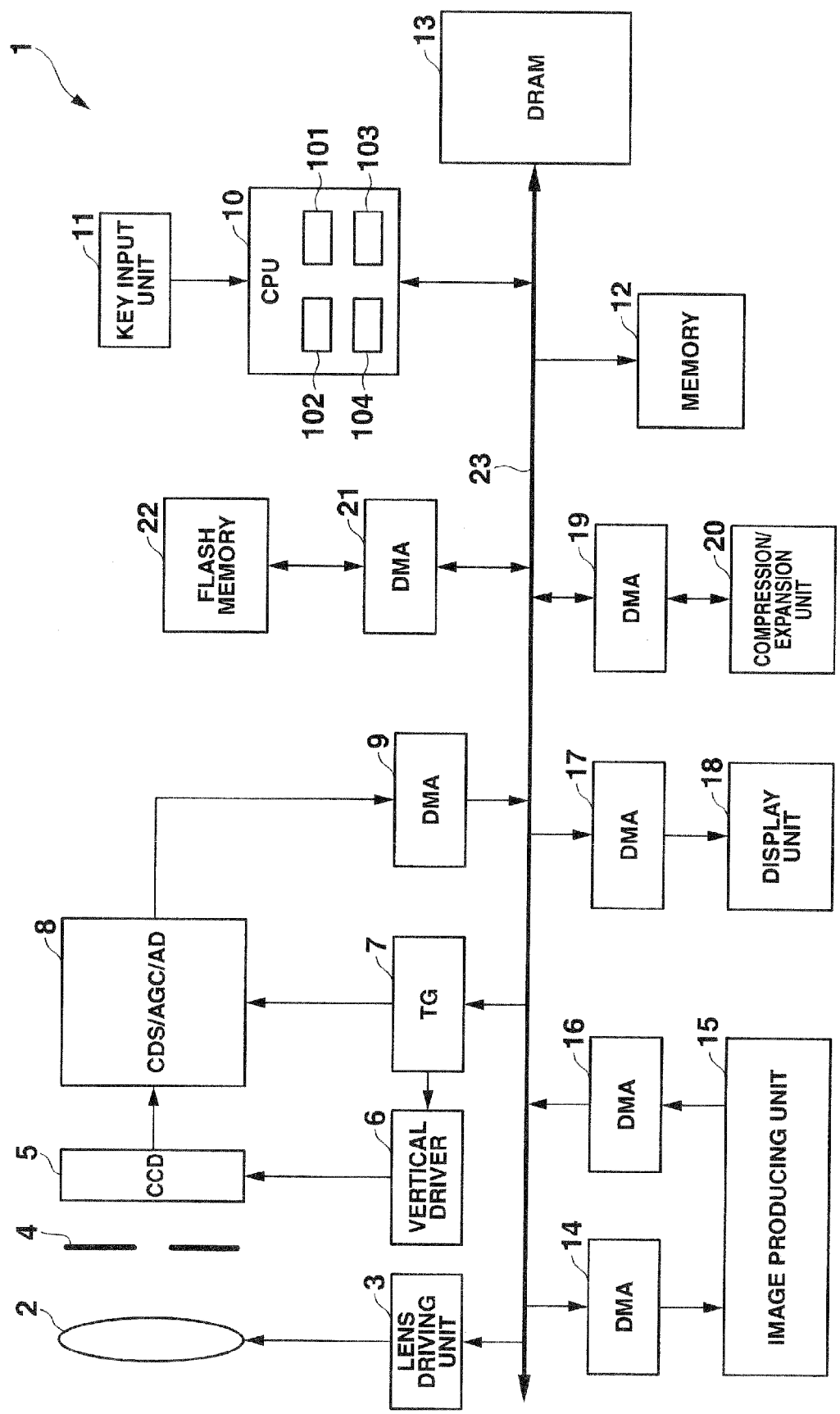
FIG. 1 is a block diagram of a digital camera according to embodiments of the present invention.

FIG. 1 is a block diagram of a circuit configuration of a digital camera 1 according to the embodiments of present invention.

The digital camera 1 comprises an image pick-up lens 2, lens driving block 3, aperture mechanism 4, CCD 5, vertical driver 6, TG (Timing Generator) 7, unit circuit 8, DMA controller (hereinafter, simply "DMA") 9, CPU 10, key input unit 11, memory 12, DRAM 13, DMA 14, image producing unit 15, DMA 16, DMA 17, display unit 18, DMA 19, compression/expansion unit 20, DMA 21, flash memory 22 and bus 23.

The image pick-up lens 2 includes a focus lens and zoom lens. The image pick-up lens 2 is connected with the lens driving block 3. The lens driving block 3 comprises a focus motor for moving the focus lens along its optical axis, and a zoom motor for moving the zoom lens along its optical axis, and further comprises a focus motor driver and zoom motor driver, wherein the focus motor driver and zoom motor driver drive the focus motor and zoom motor in accordance with control signals sent from CPU 10, respectively.

The aperture mechanism 4 has a driving circuit. The driving circuit operates the aperture mechanism 4 in accordance with a control signal sent from CPU 10.

The aperture mechanism 4 serves to adjust the amount of incident light onto CCD 5. Exposure (the amount of light received by CCD 5) is adjusted by setting an aperture and shutter speed.

CCD 5 is scanned by the vertical driver 6, whereby light intensities of R, G, B color values of an object are photoelectrically converted into an image pick-up signal every certain period. The image pick-up signal is supplied to the unit circuit 8. Operations of the vertical driver 6 and unit circuit 8 are controlled by CPU 10 in accordance with a timing signal of TG 7. Further, CCD 5 has a function of an electronic shutter. The electronic shutter is controlled by the vertical driver 6 depending on the timing signal sent from TG 7. The exposure time varies depending on the shutter speed of the electronic shutter.

The unit circuit 8 is connected with TG 7, and comprises CDS (Correlated Double Sampling) circuit, AGC circuit and A/D converter, wherein the image pick-up signal is subjected to a correlated double sampling process in CDS circuit, and to an automatic gain control process in AGC circuit, and then converted into a digital signal by A/D converter. The digital signal (Bayer pattern image data, hereinafter "Bayer data") of CCD 5 is sent through DMA 9 to the buffer memory (DRAM 13) to be recorded therein.

CPU 10 is one chip micro-computer having a function of performing various processes such as a light measurement process and recording process and displaying process. The one chip micro-computer controls the operation of the whole digital camera 1.

In particular, CPU 10 has a sequential shooting control unit 101, an index information generating unit 102, recording control unit 103, and display control unit 104. The sequential shooting control unit 101 performs a sequential shooting process using two different exposure times to obtain image data. The index information generating unit 102 generates index data for each of plural pieces of image data obtained by the sequential shooting control unit 101. The recording control unit 103 records an image file including plural pieces of image data obtained by the sequential shooting control unit 101 and plural pieces of index data generated by the index information generating unit 102. The display control unit 104 controls an image displaying operation depending on the recorded image file.

Further, CPU 10 has a function of switching an exposure time which was used to shoot frame image data. When the exposure time of frame image data to be displayed is switched by CPU 10, the display control unit 104 displays the frame image data obtained using the switched exposure time.

The key input unit 11 comprises plural manipulation keys including a shutter button for instructing to shoot a still image and/or shoot a moving image, a displaying-mode switching key, a playback mode switching key, playback key, temporarily stop key, cross key, SET key, etc. When manipulated by a user, the key input unit 11 outputs an appropriate manipulation signal to CPU 10.

In the memory 12 are stored necessary data and a control program necessary for CPU 10 to control various operations of the digital camera 1. CPU 10 works in accordance with the control program.

DRAM 13 is used as a buffer memory for temporarily storing the image data obtained by CCD 5, and also used as a work memory of CPU 10.

DMA 14 serves to read the image data (Bayer data) from the buffer memory and to output the read image data to the image producing unit 15.

The image producing unit 15 performs a pixel correction process, gamma correction process, and white balance process on the image data sent from DMA 14, and further generates luminance color difference signals (YUV data). In short, the image producing unit 15 is a circuit block for performing an image processing.

DMA 16 serves to store in the buffer memory the image data (YUV data) of the luminance color difference signals subjected to the image processing in the image producing unit 15.

DMA 17 serves to read and output the image data (YUV data) stored in the buffer memory to the display unit 18.

The display unit 18 has a color LCD and a driving circuit and displays an image of the image data (YUV data).

DMA 19 serves to output the image data (YUV data) and image data compressed and stored in the buffer memory to the compression/expansion unit 20, and to store in the buffer memory the image data compressed and/or the image data expanded by the compression/expansion unit 20.

The compression/expansion unit 20 serves to compress and/or expand image data, for example, in JPEG format and/or MPEG format.

DMA 21 serves to read the compressed image data stored in the buffer memory and to store the read image data in the flash memory 22, and further serves to read the compressed image data recorded in the flash memory 22 and to store the read compressed image data in the buffer memory.

B. Moving Image Shooting Operation

Operation of the digital camera 1 according to the present embodiment will be described, that is, a moving image shooting operation and a moving image displaying operation will be described separately.

There are prepared two exposure modes (first and second modes) in the digital camera 1 according to the present embodiment. The first mode is an exposure mode "B" in which CCD 5 is exposed to light for an exposure time "B" appropriate for shooting a moving image (playing a moving image), and the second one is an exposure mode "A" in which CCD 5 is exposed to light for an exposure time "A" appropriate for shooting a still image (displaying a still image), wherein the exposure time "A" is shorter than the exposure time "B". The exposure mode is switched every shooting operation. That is, when a shooting operation is performed in the exposure mode "A", then exposure mode "A" is switched to the exposure mode "B" in the following stage, and the shooting operation is performed in the exposure mode "B". Then, the exposure mode "B" is switched to the exposure mode "A" again, and the shooting operation is performed in the exposure mode "A".

CCD 5 is exposed to light for the exposure time "A" in the exposure mode "A", wherein the exposure time "A" (for example, 1/1200 sec.) is shorter than one frame period, and is exposed to light for the exposure time "B" (for example, 1/75 sec.) of a four frame period in the exposure mode "B". In the present embodiment, one frame period is set to 1/300 sec.

Figure 2:
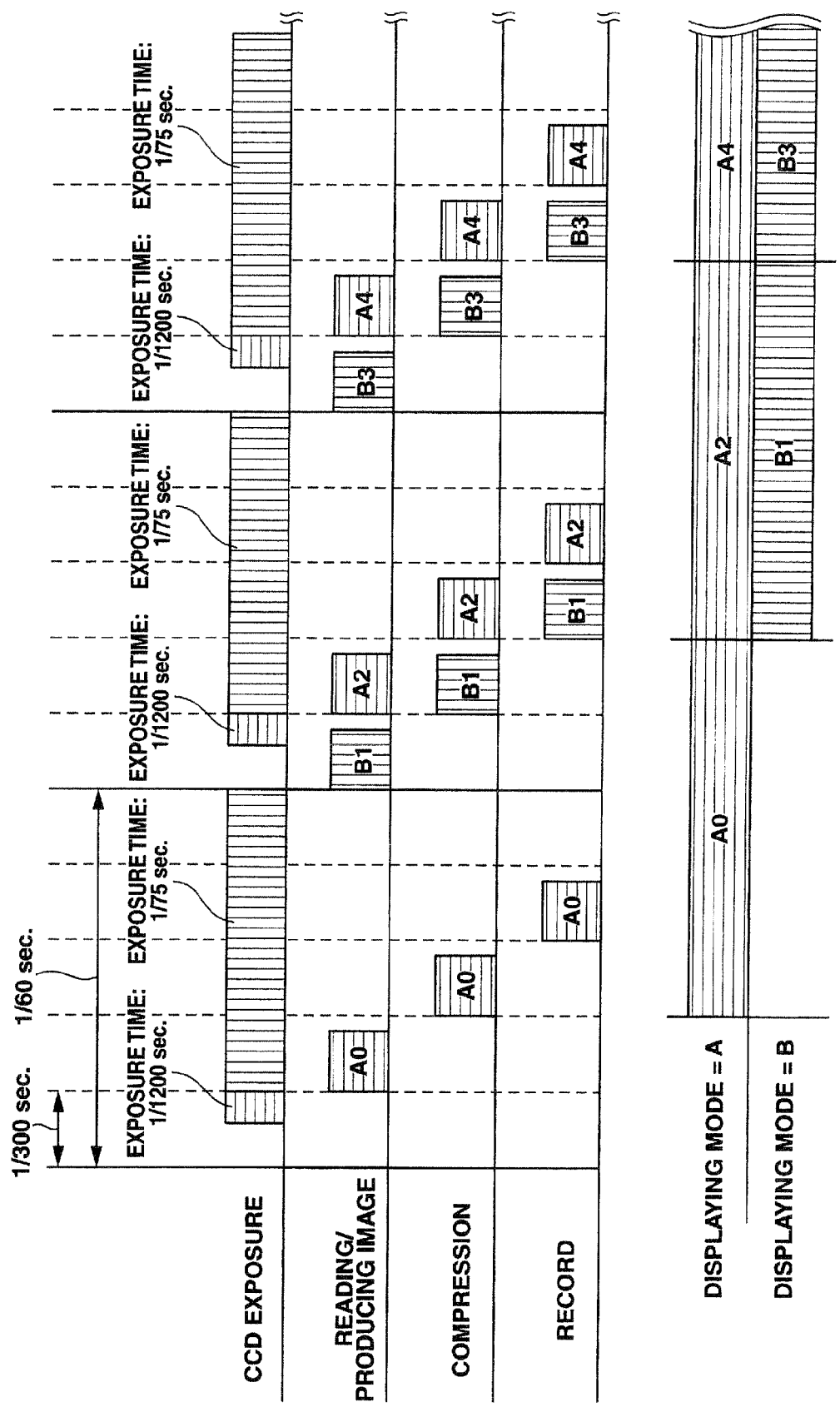
FIG. 2 is a timing chart of a moving image shooting operation.

FIG. 2 is a time chart of the moving image shooting operation.

As shown in FIG. 2, the shooting operation is performed alternately in the exposure mode "A" and the exposure mode "B".

An operation of reading image data from CCD 5 and an operation of the image producing unit 15 to generate luminance color difference signals are performed within a period of less than one frame period (less than 1/300 sec.) In short, operation of the image producing unit 15 to produce image data of the luminance color difference signals from Bayer data and to store in the buffer memory the produced image data of the luminance color difference signal is performed within a period of less than one frame period (less than 1/300 sec.), wherein Bayer data is read from CCD 5 and stored through the unit circuit 8 in the buffer memory. An aperture, sensitivity (for example, gain value), and ND (Neutral Density) filter are adjusted a balance in luminance level between frame image data obtained in the exposure mode "B" and frame image data obtained in the exposure mode "A". It is presumed in the present embodiment that only the gain value is adjusted the balance in the luminance level between the frame image data obtained in the exposure mode "B" and the frame image data obtained in the exposure mode "A" and that the gain value is set to one times of a normal gain value for shooting operation in the exposure mode "B" and the gain value is set to 16 times of the normal gain value for shooting operation in the exposure mode "A", thereby equalizing the luminance level of the frame image data obtained in the exposure mode "B" and the luminance level of the frame image data obtained in the exposure mode "A".

Compression of the image data of the luminance color difference signals and recording the compressed image data are performed within a period of less than one frame period. In short, a series of operations are performed within a period of less than one frame period, wherein the series of operations include operation of the compression/expansion unit 20 to compress the image data of the luminance color difference signals stored in the buffer memory and to store the compressed image data in the buffer memory, and operation of reading the compressed image data from the buffer memory and storing the read data in the flash memory 22

Hereinafter, the frame image data which is obtained in the exposure mode "A" is referred to as "frame image data "A" and the frame image data which is obtained in the exposure mode "B" is referred to as "frame image data "B". The frame image data is displayed with the number (frame number) attached to, wherein the number indicates how many pieces of frame image data were shot before the displayed frame image data. The number is counted up from the number of "0".

For instance, the frame image data A0 in FIG. 2 is frame image data shot for the 0-th time in the exposure mode "A". The frame image data B1 is frame image data shot for the first time in the exposure mode "B".

In the present embodiment, a shooting operation is performed in the exposure mode "A" at first, and then the exposure mode "A" is switched to the exposure mode "B", and the shooting operation is performed in the exposure mode "B". The frame image data shot in the exposure mode "A" is expressed in frame image data A(2n), and the frame image data shot in the exposure mode "B" is expressed in frame image data B(2n+1), where "n"=0, 1, 2, 3, . . . . The term "n" is referred to as a frame number.

Figure 3:
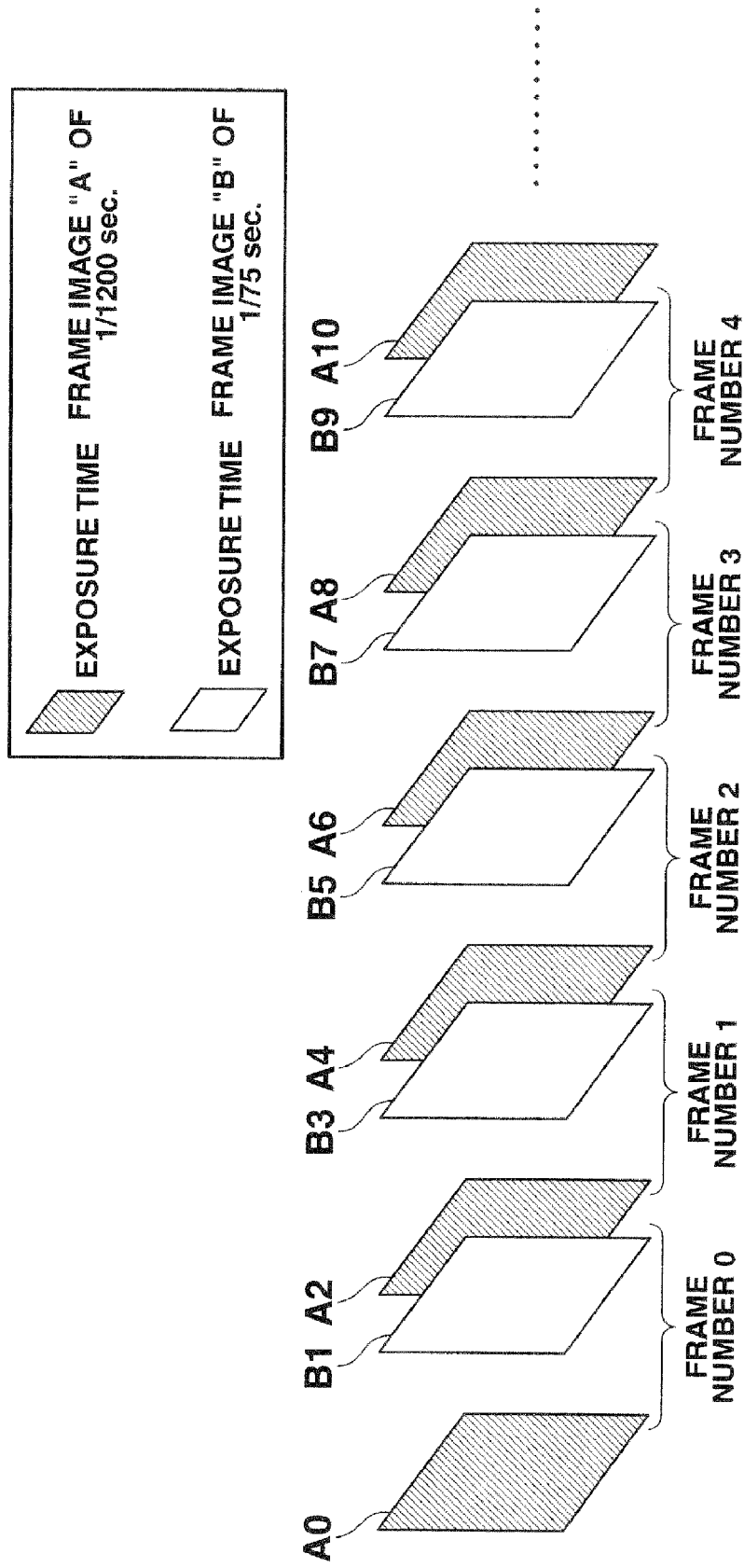
FIG. 3 is a view illustrating plural pieces of obtained frame image data and frame numbers "n" of the frame image data.

FIG. 3 is a view illustrating plural pieces of frame image data shot alternately in the exposure mode "A" and the exposure mode "B", and bearing the frame number "n".

As shown in FIG. 3, the frame image data "A" and frame image data "B" are shot or obtained alternately in the exposure mode "A" and the exposure mode "B", and the number attached to the frame image data indicates the shooting order at which such frame image data is shot.

Further, the frame number indicates the shooting order of the frame image data shot or obtained in the exposure time "A" or in the exposure time "B". For instance, the frame number "n" of the frame image data "B1" is "0", and therefore the frame image data "B1" is data shot or obtained using an exposure time of 1/75 sec. for the 0-th time, and the frame number "n" of the frame image data "A8" is "4", and therefore the frame image data "A8" is data shot or obtained using an exposure time of 1/1200 sec. for the fourth time.

The shooting operation is performed alternately in the exposure mode "A" and the exposure mode "B", and the exposure time is less than one frame period in the exposure mode "A" and is equivalent to four frame periods in the exposure mode "B". Therefore, both the shooting period of frame image data "A" in the exposure mode "A" and the shooting period of frame image data "B" in the exposure mode "B" will be 1/60 sec.

There are prepared two displaying modes (first and second modes) in the digital camera 1, that is, the first one is a displaying mode "A" which displays the frame image data "A" shot or obtained in the exposure mode "A", and the second one is a displaying mode "B" which displays the frame image data "B" shot or obtained in the exposure mode "B". These displaying modes are alternately switched in response to the user's manipulation of the key input unit 11.

As shown in FIG. 2, when the exposure mode "A" is set, plural pieces of frame image data "A" are sequentially displayed, and when the exposure mode "B" is set, plural pieces of frame image data "B" are sequentially displayed.

The displaying modes "A", "B" are prepared for switching a displaying operation of displaying a moving image in real time in a moving image shooting mode, but not for switching the displaying operation of displaying a moving image in a moving image playback mode.

Hereinafter, the moving image shooting operation is separated into a moving image shooting/recording operation and a real time displaying operation in the moving image shooting/recording process for the explanation purpose, and the moving image shooting operation and real time displaying operation will be described separately.

B-1. Moving Image Shooting/Recording Operation

The moving image shooting/recording operation will be described with reference to a flow chart shown in FIG. 4.

When the shutter button of the key input unit 11 is pressed by the user in the moving image shooting mode, that is, when a manipulation signal is sent from the key input unit 11 to CPU 10 in response to the user's pressing operation of the shutter button, CPU 10 determines that the moving image shooting/recording process has started and sets the exposure mode "A" and displaying mode "A" at step S1. An exposure-mode recording area and displaying-mode recording area of the buffer memory are renewed in accordance with the exposure mode "A" and displaying mode "A" set at step S1. In short, a term "A" is stored both in the exposure mode recording area and displaying mode recording area of the buffer memory.

The sequential shooting control unit 101 of CPU 10 judges at step S2 whether or not the exposure mode "A" has been set currently. The judgment is made based on data stored in the exposure mode recording area of the buffer memory.

When it is determined at step S2 that the exposure mode "A" has been set (YES at step S2), the sequential shooting control unit 101 of CPU 10 sets the exposure time to $1/1200$ sec. and the gain value to 16 times of a normal gain value, respectively at step S3, and then advances to step S5. The normal gain value is a gain value set when the shooting operation is performed in the exposure mode "B" Now, since the exposure time has been set to $1/1200$ sec. in the exposure mode "A" and the exposure time has been set to $1/75$ sec. in the exposure mode "B", the exposure time in the exposure mode "A" will be $1/16$ of the exposure time in the exposure mode "B". Therefore, when the gain value is set to 16 times of the normal gain value, the frame image data "A" shot in the exposure mode "A" and the frame image data "B" shot in the exposure mode "B" are balanced in the luminance level.

Meanwhile, it is determined at step S2 that the exposure mode "A" has not been set (NO at step S2), that is, it is determined at step S2 that the exposure mode "B" has been set, the sequential shooting control unit 101 of CPU 10 sets the exposure time to $1/75$ sec. and the gain value to one times of the normal gain value, respectively at step S4 and then advances to step S5.

The sequential shooting control unit 101 of CPU 10 performs the shooting operation using the exposure time and the gain value set at step S4. In other words, image data accumulated on CCD 5 during the set exposure time is read, and a gain of the read image data is adjusted based on the set gain value in AGC of the unit circuit 8, and then image data of the luminance color difference signals is generated from gain adjusted image data by the image producing unit 15. The generated image data is stored in the buffer memory (step S5).

The display control unit 104 of CPU 10 judges at step S6 whether or not the displaying mode set currently corresponds to the exposure mode set currently. That is, the display control unit 104 of CPU 10 judges whether or not the term "A" or "B" is stored both in the exposure mode recording area and displaying mode recording area of the buffer memory.

When it is determined at step S6 that the displaying mode set currently corresponds to the exposure mode set currently (YES at step S6), the display control unit 104 of CPU 10 stores in a display recording area of the buffer memory information (address information of the frame image data) specifying frame image data shot most recently to be displayed next at step S7. That is, the information is updated in the display recording area of the buffer memory. When the exposure mode "A" is set, the frame image data "A" shot in the exposure mode "A" is specified as frame image data to be displayed next, and when the exposure mode "B" is set, the frame image data "B" shot in the exposure mode "B" is specified as frame image data to be displayed next. At this time, CPU 10 keeps the specified frame image data in the buffer memory until such specified frame image data displayed on the display unit 18.

Figure 4:
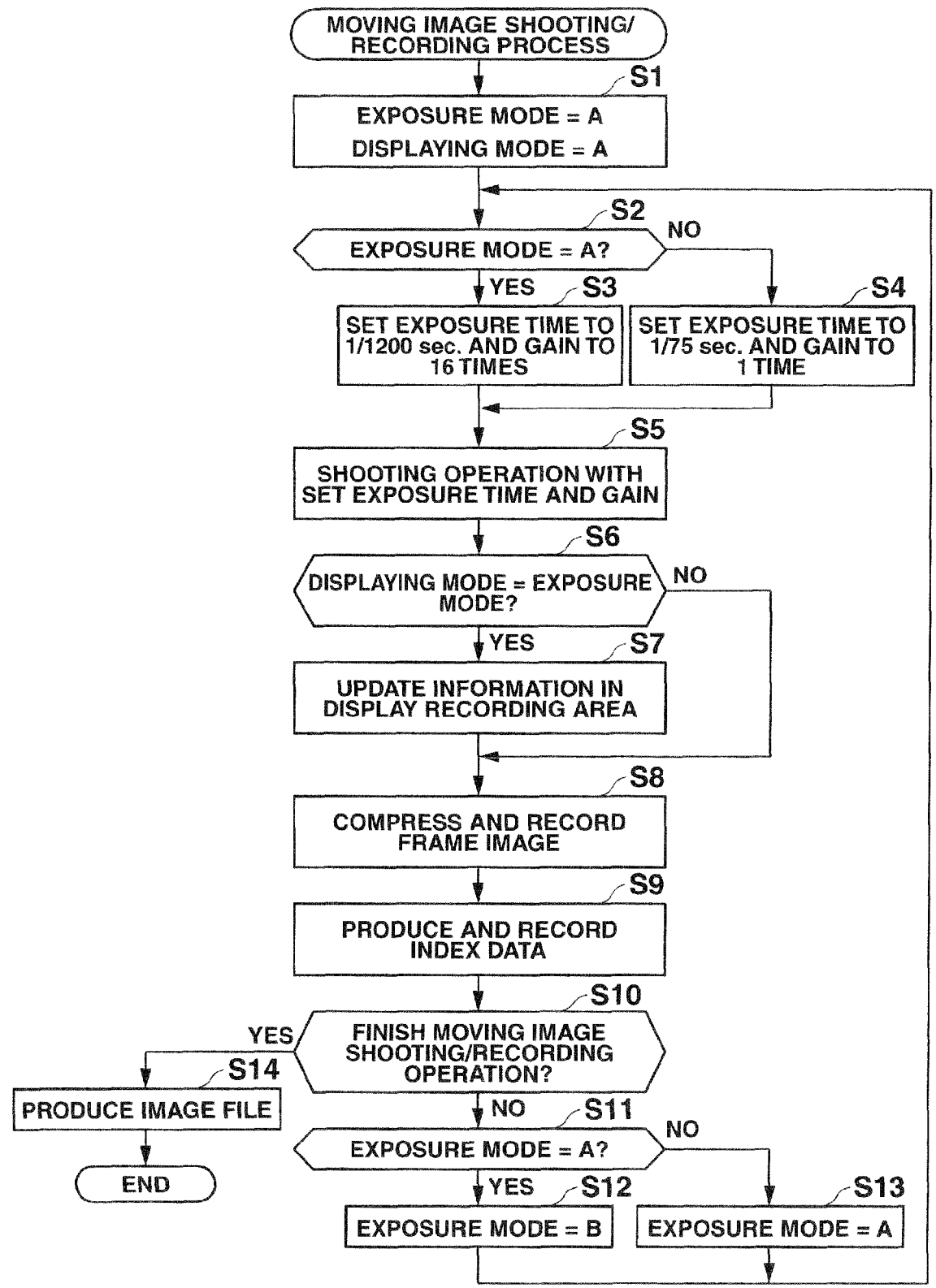
FIG. 4 is a flow chart of a moving image shooting/recording operation.

The displaying mode is switched in response to the user's manipulation on the displaying-mode switching key of the key input unit 11 (not shown in the flow chart of FIG. 4). CPU 10 updates the information stored in the displaying-mode recording area of the buffer in response to the user's manipulation on the displaying-mode switching key of the key input unit 11. For example, when the term "A" is stored in the displaying-mode recording area of the buffer, the term "B" is stored therein in place of the term "A" in response to the user's manipulation of the displaying-mode switching key, and when the term "B" is stored in the displaying-mode recording area of the buffer, the term "A" is stored therein in place of the "B" in response to the user's manipulation of the displaying-mode switching key.

Meanwhile, when it is determined at step S6 that the displaying mode set currently does not correspond to the exposure mode set currently (NO at step S6), then CPU 10 advances directly to step S8.

The recording control unit 103 of CPU 10 controls the compression/expansion unit 20 at step S8 to compress the frame image data stored in the buffer memory and to record the compressed frame image data in the flash memory 22.

Then, the index information generating unit 102 generates index data of the frame image data recorded in the flash memory 22, and the recording control unit 103 records the generated index data in the flash memory 22 at step S9. The index data includes the frame number "n" of the frame image data, address information indicating where the frame image data is recorded, and the exposure mode information indicating the exposure mode in which the frame image data is shot or obtained.

The sequential shooting control unit 101 of CPU 10 judges at step S10 whether or not the process of sequentially shooting a moving image should be finished. The judgment is made depending on whether or not a manipulation signal is sent from the key input unit 11 to CPU 10.

When it is determined at step S10 that the process of sequentially shooting a moving image should not be finished (NO at step S10), the sequential shooting control unit 101 of CPU 10 judges at step S1 whether or not the exposure mode "A" has been set currently.

When it is determined at step S11 that the exposure mode "A" has been set currently (YES at step S11), the sequential shooting control unit 101 of CPU 10 sets the exposure mode "B" at step S12, and returns to step S2.

Meanwhile, when it is determined at step S1 that the exposure mode "A" has not been set currently, that is, that the exposure mode "B" has been set currently (NO at step S11), the sequential shooting control unit 101 of CPU 10 sets the exposure mode "A" at step S13, and returns to step S2.

When CPU 10 operates as described above, the frame image data "A" and the frame image data "B" are alternately shot using the exposure time of $1/1200$ sec. and exposure time of $1/75$ sec. and recorded as shown in FIG. 3.

Meanwhile, when it is determined at step S10 that the process of sequentially shooting a moving image should be finished (YES at step S10), the recording control unit 103 of CPU 10 generates an image file using the recorded frame image data and index data at step S14.

Figure 5:
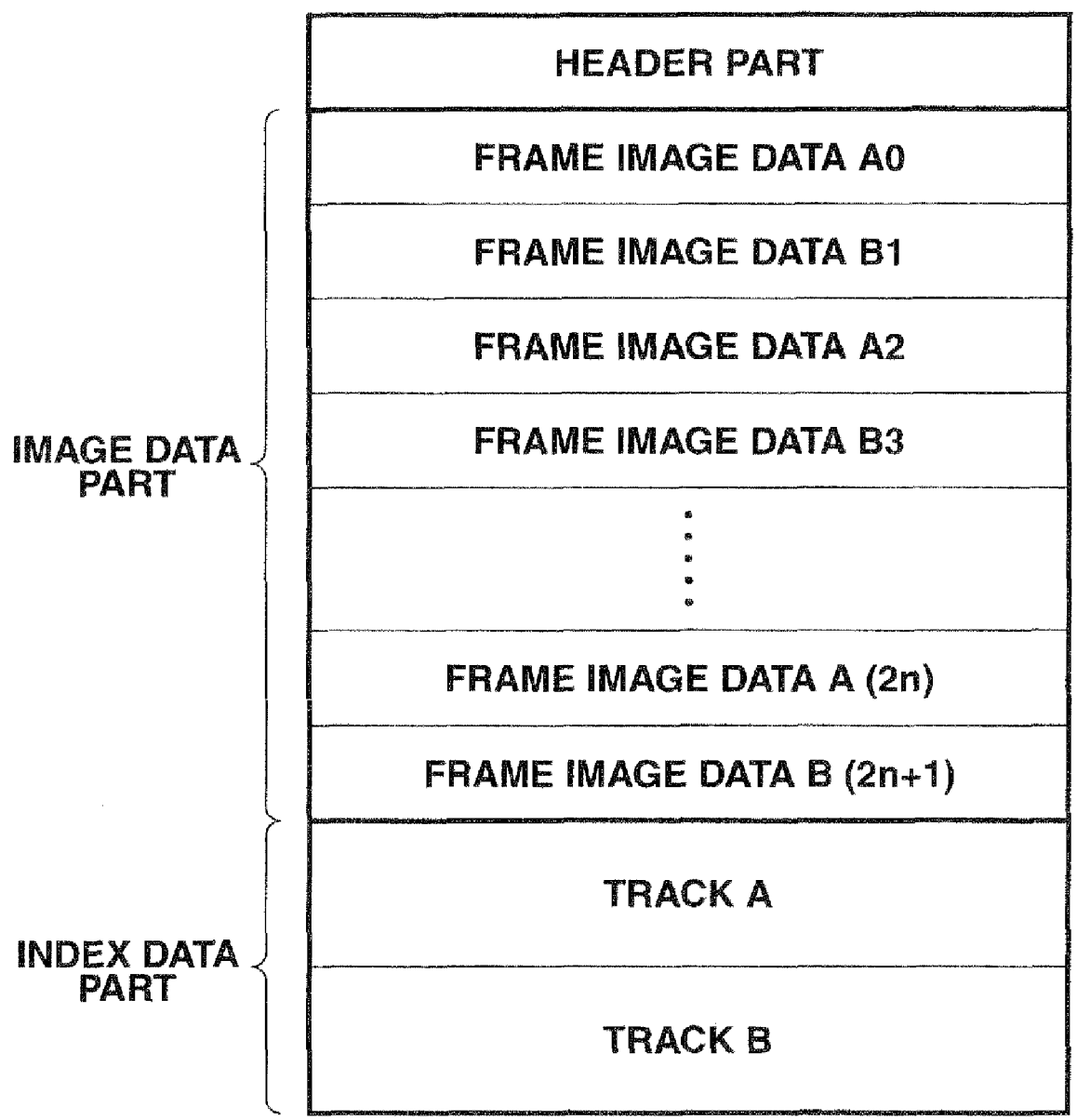
FIG. 5 is a view illustrating a produced image file.

FIG. 5 is a view showing an example of the image file generated at step S14. The image file has a header part, image data part, and index data part. In the image data part are recorded the shot and compressed frame image data (frame image data "A0", frame image data "B1", frame image data "A2", frame image data "B3", . . . , frame image data "A(2n)" and frame image data "B(2n+1)").

The index data part has a track "A" and track "B".

Figure 6:
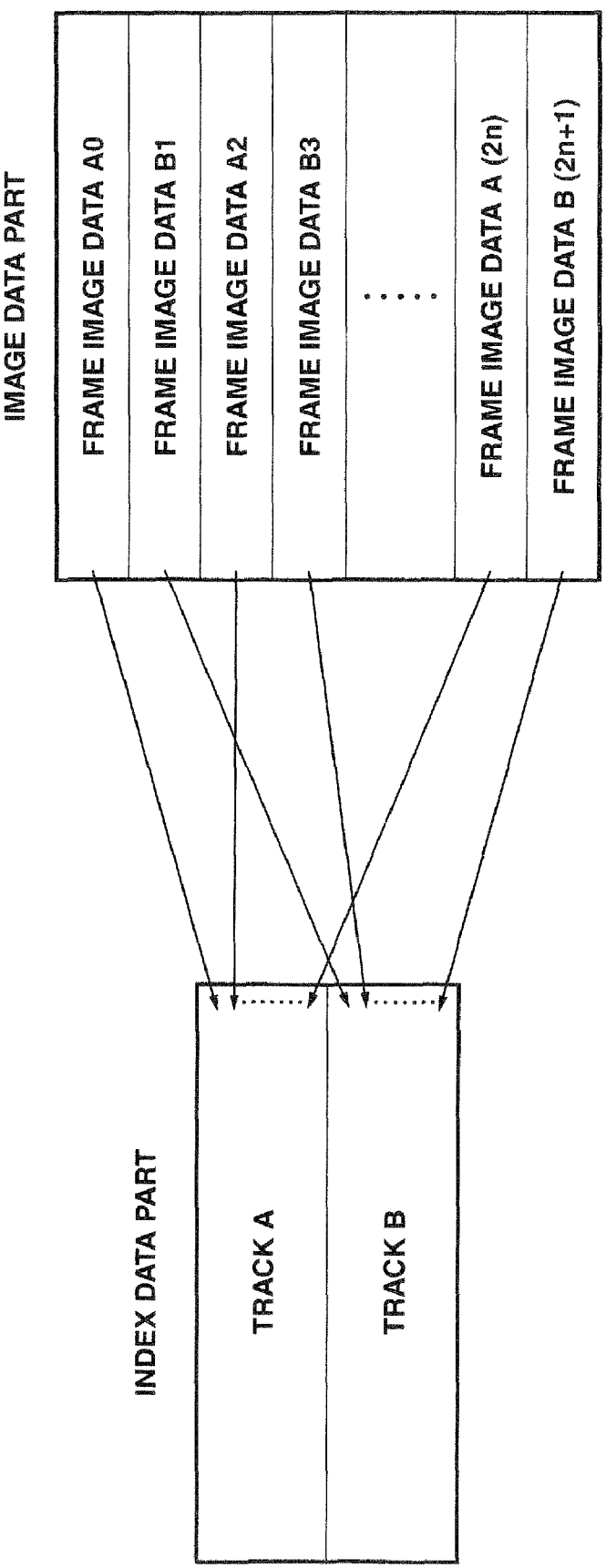
FIG. 6 is a view illustrating relationship between tracks "A" and "B" and plural pieces of recorded frame image data.

FIG. 6 is a view showing a relationship between the tracks A and B and the recorded frame image data.

As shown in FIG. 6, in the track "A" is recorded index data of the frame image data "A", and in the track B is recorded index data of the frame image data "B".

B-2. Real Time Displaying Operation in Moving Image Shooting/Recording Process

Figure 7:
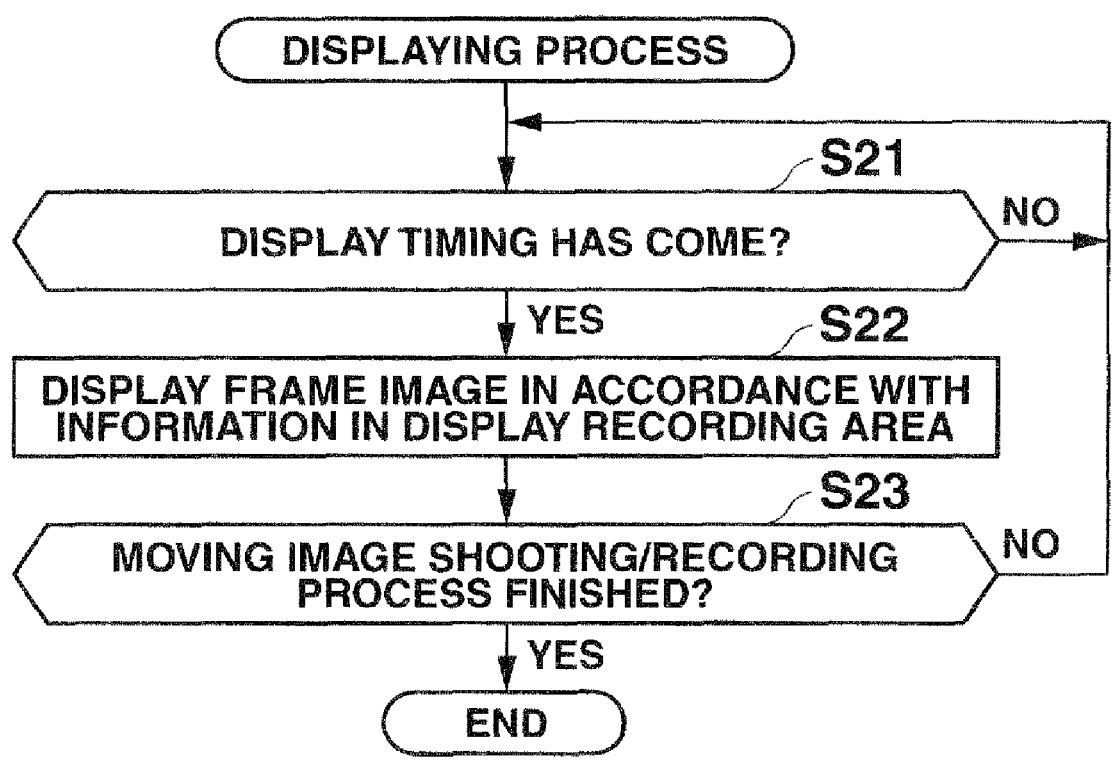
FIG. 7 is a flow chart of a real-time displaying operation in a moving image shooting/recording process.

A displaying operation in the moving image recording process will be described with reference to a flow chart of FIG. 7.

When the moving image recording process starts, the display control unit 104 of CPU 10 judges at step S21 whether or not it has reached a display timing. The display timing comes every 1/60 sec. Since the frame image data "A" is shot every 1/60 sec. and also the frame image data "B" is shot every 1/60 sec., the display timing is set so as to come every 1/60 sec. That is, to display in real time either moving image data (moving image data "A") consisting of plural pieces of frame image data "A" or moving image data (moving image data "B") consisting of plural pieces of frame image data "B", the display timing is set so as to come every 1/60 sec.

When the display timing has not yet come at step S21, CPU 10 repeatedly judges at step S21 whether or not the display timing has come until it is determined that the display timing has come. When the display timing has come (YES at step S21), the display control unit 104 of CPU 10 displays at step S22 the frame image data stored in the buffer memory based on the frame image data specified to be displayed next in those currently stored in the display recording area. Since information for specifying frame image data corresponding to the displaying mode set currently is stored in the display recording area at steps S6 and S7 in FIG. 4, the frame image data corresponding to the current displaying mode can be displayed at step S22.

For instance, in the case where the displaying mode A is set currently, since information for specifying the frame image data "A" is updated and stored in the display recording area, the frame image data "A" is displayed. In the case where the displaying mode "B" is set currently, since information for specifying the frame image data "B" is updated and stored in the display recording area, the frame image data "B" is displayed.

The sequential shooting control unit 101 of CPU 10 judges at step S23 whether or not the moving image shooting/recording process should be finished. The judgment is made in a similar manner to step S10 in FIG. 4, that is, the judgment is made depending on whether or not a manipulation signal is sent from the key input unit 11 to CPU 10.

When it is determined at step S23 that the moving image shooting/recording process should not be finished (No at step S23), CPU 10 returns to step S21.

In the moving image shooting/recording process, the shooting operation is performed alternately in the exposure mode "A" (exposure time is 1/1200 sec.) and the exposure mode "B" (exposure time is 1/75 sec.), and plural pieces of frame image data are obtained and stored successively, and plural pieces of frame image data shot in the exposure mode corresponding to the currently set displaying mode are successively displayed, whereby either smooth moving image data or in-focus moving image data can be displayed.

C. Moving Image Playback Operation

There are prepared three moving image playback modes (first, second and third playback modes) in the digital camera 1 according to the present embodiment. The first mode is a moving image playback mode "A" for displaying moving image data "A" consisting of plural pieces of frame image data "A" shot in the exposure mode "A". The second mode is a moving image playback mode "B" for displaying image data "B" consisting of plural pieces of frame image data "B" shot in the exposure mode "B". The third mode is an automatic selection playback mode for displaying the moving image data B while displaying a moving image, and for displaying the moving image data "A" while the digital camera 1 stays in a pause state, wherein the moving image data B consists of plural pieces of frame image data "B" successively shot in the exposure mode "B", and the moving image data "A" consists of plural pieces of frame image data "A" successively shot in the exposure mode "A".

In the moving image playback mode "A", the plural pieces of frame image data "A" are successively displayed in order of increasing frame number "n" depending on the index data recorded in the track "A". In the moving image playback mode "B", the plural pieces of frame image data "B" are successively displayed in order of increasing frame number "n" depending on the index data recorded in the track "B".

In the automatic selection playback mode, depending on the index information recorded in the track "B", the plural pieces of frame image data "B" are successively displayed in order of increasing frame number "n" during the moving image displaying, and the frame image data "A" corresponding to the frame image data "B" which is displayed when the camera has been brought into the pause state is displayed in the pause state, depending on the index information recorded in the track "A".

Now, the moving image displaying operation in the automatic selection playback mode will be described with reference to a flow chart of FIG. 8.

When the playback mode is switched to the automatic selection playback mode in response to the user's manipulation of the playback mode switching key and an image file to be displayed is selected, the display control unit 104 of CPU 10 brings the digital camera 1 into a displaying operation at step S51, and sets the frame number to be displayed to the number "0" (the frame number=0) at step S52.

The display control unit 104 of CPU 10 performs a stand-by process at step S53 until the display timing is reached. An interval of the display timing is determined depending on a display frame rate. In the present embodiment, since the display frame rate is 60 fps., the display timing comes every 1/60 sec.

The display control unit 104 of CPU 10 judges at step S54 whether or not the digital camera 1 is in the displaying operation.

When it is determined at step S54 that the digital camera 1 is in the displaying operation (YES at step S54), the display control unit 104 of CPU 10 judges at step S55 whether or not a pause manipulation has been performed by the user. The judgment is made depending on whether or not a manipulation signal corresponding to the pause key manipulation is sent from the key input unit 11 to CPU 10.

When it is determined at step S55 that pause manipulation has not been performed (NO at step S55), the display control unit 104 of CPU 10 reads from the flash memory 22 the compressed frame image data "B" corresponding to the frame number set currently and stores the read frame image data in buffer memory, depending on the index information stored in the track B of the image file to be displayed (step S56), For example, in the case where the frame number "n" is set to "2" currently, the frame image data "B5" is read from the flash memory 22.

Further, the display control unit 104 of CPU 10 increments the frame number "n" to n=n+1. For instance, in the case where the frame number "n" is set to "2", the frame number is incremented to "3".

The display control unit 104 of CPU 10 makes the compression/expansion unit 20 expand the frame image data "B" read most recently at step S68 and displays the expanded frame image data "B" on the display unit 18 at step S69. For example, in the case where the frame number "n" is set to "2", the frame image data "B5" is displayed on the display unit 18. Then, the display control unit 104 of CPU 10 judges at step S70 whether or not the displaying operation should be finished. When it is determined at step S70 that the displaying operation should not be finished (NO at step S70), CPU 10 returns to step S53.

When the frame image data corresponding to the last frame number "n" is displayed, or when an instruction to finish the displaying operation is given in response to the user's manipulation of the key input unit 11, it is determined that the displaying operation should be finished.

Meanwhile, it is determined at step S55 that the pause manipulation has been performed (YES at step S55), depending on the index information stored in the track "A" of the image file to be displayed, the display control unit 104 of CPU 10 reads from the flash memory 22 the compressed frame image data "A" corresponding to the frame number "n" set currently and stores the data "A" in the buffer memory at step S58. For instance, in the case the frame number "n" is set to "2", the frame image data "A4" is read from the flash memory 22.

The display control unit 104 of CPU 10 sets the digital camera 1 to the pause state at step S59. The display control unit 104 of CPU 10 makes the compression/expansion unit 20 expand the frame image data "A" read most recently at step S68, thereby displaying the expanded frame image data "A" on the display unit 18 at step S69. And when it is determined at step S70 that the displaying operation should not be finished, CPU 10 returns to step S53.

Meanwhile, when it is determined at step S54 that the digital camera 1 is not in the displaying operation, that is, the digital camera 1 stays in the pause state, (NO at step S54), CPU 10 advances to step S60 in FIG. 9. The display control unit 104 of CPU 10 judges at step S60 whether or not the user has manipulated to start the displaying operation again. The judgment is made depending on whether or not a manipulation signal corresponding to manipulation on a displaying key has been sent from the key input unit 11 to CPU 10.

When it is determined at step S60 that the user has manipulated to start the displaying operation again (YES at step S60), depending on the index data stored in the track B of the image file to be displayed, the display control unit 104 of CPU 10 reads from the flash memory 22 the compressed frame image data "B" corresponding to the frame number "n" set currently and stores the data "B" in the buffer memory at step S61.

Then, the display control unit 104 of CPU 10 increments the frame number "n" by "1" to n=n+1 at step S62, thereby bringing the digital camera 1 into the displaying state at step S63.

Figure 8:
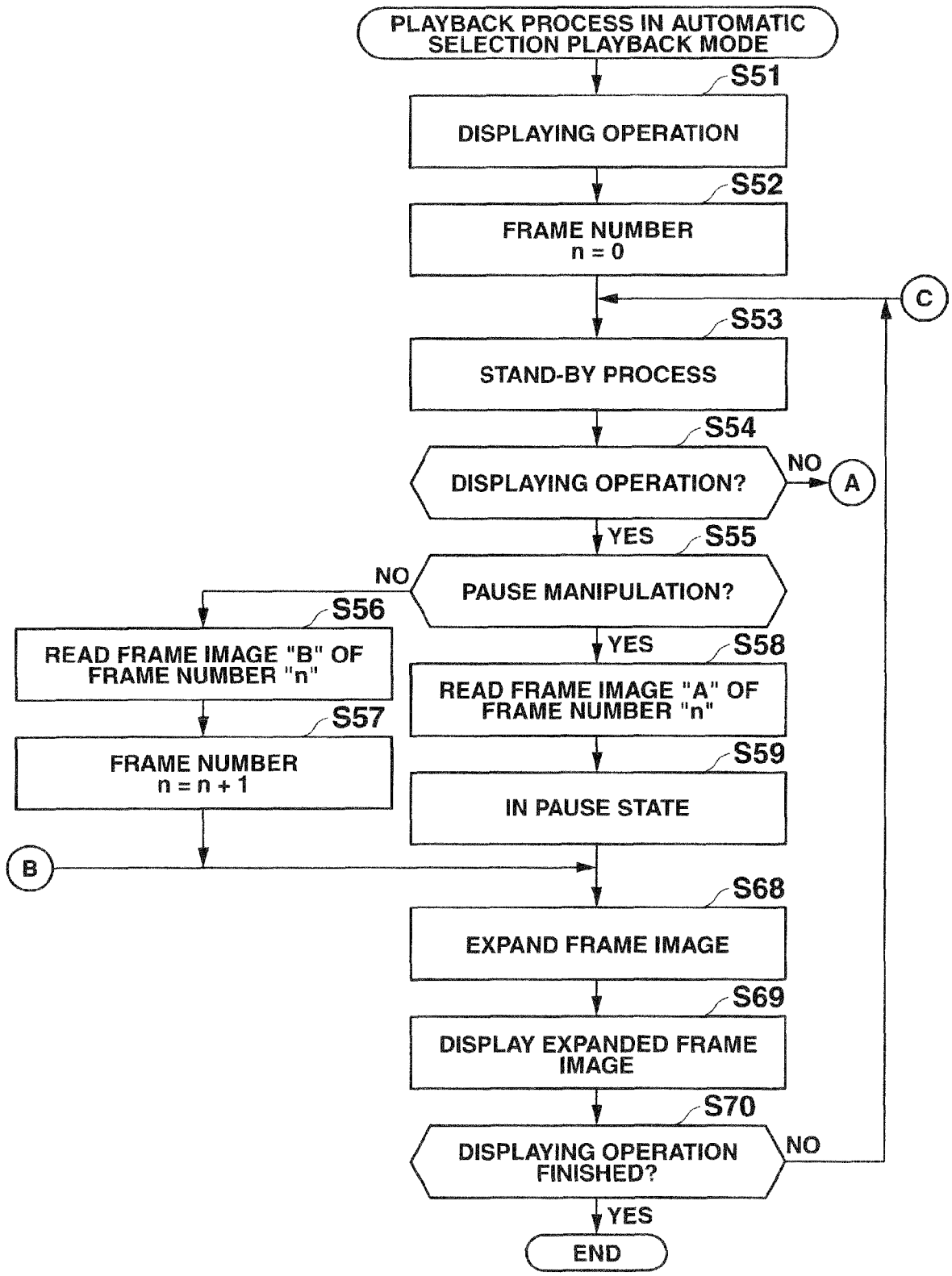
FIG. 8 is a flow chart of a moving image displaying operation in an automatic selection playback mode.

The display control unit 104 of CPU 10 makes the compression/expansion unit 20 expand the frame image data "B" read most recently at step S68 in FIG. 8, thereby displaying the expanded frame image data "B" on the display unit 18 at step S69. When it is determined at step S70 that the displaying operation should not be finished, CPU 10 returns to step S53.

Meanwhile, it is determined at step S60 that the digital camera 1 is not in the displaying operation (NO at step S60), the display control unit 104 of CPU 10 judges whether or not the frame by frame advancing/retreating manipulation has been performed. The judgment is made depending on whether or not a manipulation signal corresponding to manipulation of "->" key or "<-" key of the cross key has been sent from the key input unit 11 to CPU 10.

When it is determined at step S64 that the frame by frame advancing/retreating manipulation has been performed (YES at step S64), the display control unit 104 of CPU 10 increments or decrements the frame number "n" to set n=n+1 or n=n−1 in response to the frame by frame advancing/retreating manipulation at step S65. When "->" key of the cross key is manipulated, the frame number "n" is set to n=n+1, and when "<-" key of the cross key is manipulated, the frame number "n" is set to n=n−1.

Meanwhile, when it is determined at step S64 that the frame by frame advancing/retreating manipulation is not performed (NO at step S64), the display control unit 104 of CPU 10 displays the frame image data "A" expanded most recently, that is, the display control unit 104 of CPU 10 displays the frame image data "A" previously displayed on the display unit 18 at step S67, and returns to step S53. In other words, the frame image data "A" displayed most recently is continuously displayed as a still image on the display unit 18.

The display control unit 104 of CPU 10 makes the compression/expansion unit 20 expand the frame image data "A" read most recently at step S68 in FIG. 8, thereby displaying the expanded frame image data "A" on the display unit 18 at step S69. And when it is determined at step S70 that the displaying operation should not be finished, CPU 10 returns to step S53.

Meanwhile, when it is determined at step S64 that the frame by frame advancing manipulation is not performed (NO at step S64), the display control unit 104 of CPU 10 displays the frame image data "A" expanded most recently, that is, the display control unit 104 of CPU 10 displays the frame image data "A" previously displayed on the display unit 18 at step S67, and returns to step S53. In other words, the frame image data "A" displayed most recently is continuously displayed as a still image on the display unit 18.

As described above, in the automatic selection displaying process, the plural pieces of frame image data "B" are successively displayed in order of increasing frame number "n" during the displaying operation, and when the pause manipulation is performed, the frame image data "A" is displayed, that has the frame number which is larger by "1" than the frame image data "B" displayed most recently. For example, in the case where the frame image data "B5" is displayed most recently, the frame image data "A" is continuously displayed, that has the frame number "3" which is larger by "1" than the frame image data "B5".

When the frame by frame advancing/retreating manipulation is performed in the pause state, the frame image data "A" of the previous frame number "n" or of the next frame number "n" is displayed in response to the frame by frame advancing manipulation.

When the displaying operation is resumed in the pause state, plural pieces of frame image data "B" are successively displayed starting from the frame image data having the same frame number as the frame image data "A" which has been continuously displayed. For example, when the displaying operation is resumed while the frame image data "A6" is being displayed, plural pieces of frame image data "B" are successively displayed starting from the frame image data having the same frame number "B7" as the frame image data "A6".

In the present embodiment described above, the shooting operation using a long exposure time and shooting operation using a short exposure time are alternately performed in a continuous manner and image data obtained or shot in the shooting operations is recorded in a single image file, whereby the image data shot using the long exposure time can be displayed in the displaying operation and the image data shot using the short exposure time can be displayed in the pause state. Therefore, a beautiful moving image of an object moving smoothly can be displayed in the moving image displaying operation, and a clear and sharp image can be displayed as a still image in the pause state.

In the real time displaying operation during the moving image shooting/recording process, since the frame image data "A" obtained using the short exposure time or the frame image data "B" obtained using the long exposure time can be displayed as a moving image depending on the displaying mode set by the user, the user can select an arbitrary displaying state. In other words, the user can switch the exposure condition used for shooting the moving image data to be displayed and display the moving image data shot using the switched exposure condition.

In the moving image displaying operation, depending on the moving image playback mode set by the user, the frame image data "A" obtained using the short exposure time or the frame image data "B" obtained using the long exposure time can be displayed as a moving image, and the frame image data "A" obtained using the short exposure time can be displayed as a still image. Therefore, the user can select an arbitrary displaying state. In other words, the user can switch the exposure condition which was used for shooting the frame image data to be displayed and display the image data shot using the switched exposure condition.

When the displaying operation is suspended while a moving image including the frame image data "B" is being displayed, the frame image data "A" corresponding to the frame image data "B" displayed most recently is continuously displayed. Therefore, even though the pause manipulation is performed, the frame image data "A" can be displayed, that is shot at a timing close to the shooting timing of the frame image data "B" that is displayed at the time when the pause manipulation is performed. Therefore, the moving image can be suspended without any uncomfortable feeling. Further, a clear and sharp image can be displayed as the suspended image.

When the moving image displaying operation is resumed in the pause state, the moving image displaying operation starts from the frame image data "B" corresponding to the frame image data "A" that is displayed at the time when the moving image displaying operation has been resumed. In this manner, the moving image displaying operation can start from the frame image data "B" shot at a timing close to the shooting timing of the frame image data "A" that is displayed at the time when the pause manipulation is performed. Therefore, the moving image displaying can be resumed without any uncomfortable feeling. Further, a clear moving image can be displayed.

When the frame by frame advancing/retreating manipulation is performed in the pause state, since other frame of image data "A" is successively displayed in response to the frame by frame advancing manipulation, the user is allowed to find or carefully review his or her desired image.

Index data is produced for every piece of frame image data, and the produced index data is classified by each exposure time and recorded in the image file. For example, the index data of the frame image data "A" shot using the short exposure time is recorded in the track "A", and the index data of the frame image data "B" shot using the long exposure time is recorded in the track "B". Therefore, in the case where the frame image data "A" obtained using a short exposure time is to be displayed, the frame image data to be displayed can be designated depending on the data of the track "A", and in the case where frame image data "B" obtained using a long exposure time is to be displayed, the frame image data to be displayed can be designated depending on the data of the track "B", whereby processing load can be reduced in the displaying process for displaying the frame image data shot under the shooting condition desired for displaying an image.

MODIFICATIONS TO EMBODIMENTS OF THE INVENTION

Modifications may be made to the embodiments described above as follows:

(01) In the above embodiments, the shooting operation using a short exposure time and the shooting operation using a long exposure time are alternately performed. But in place of the above shooting operations, the shooting method may be used, such that the shooting operations which are continuously performed using a short exposure time once or plural times and the shooting operations which are continuously performed using a long exposure time plural times are alternately performed.

In other words, the shooting method is repeatedly performed, in which the shooting operation using an exposure time are performed once or plural times and then the shooting operations using other exposure time are performed plural times.

Further, shooting operations using a different exposure times are performed but in place of using a different exposure times, different exposure conditions may be used in place of the exposure time for shooting operations.

(02) In the automatic selection displaying operation in the embodiments, when the pause manipulation is performed in the moving image displaying process, or when the displaying operation is resumed in the pause state, the frame image data "A" and the frame image data "B" are switched to be displayed depending on the frame number "n". Point is that the frame image data displayed most recently is switched to the appropriate frame image data shot using another exposure time to be displayed thereafter. The appropriate frame image data is the frame image data which is shot using a different exposure time most recently, or just before or just after the frame image data displayed most recently.

Modification may be made to the embodiments such that when the pause manipulation is performed in the moving image displaying process, the "appropriate frame image data" is displayed, which is different from the "appropriate frame image data" to be displayed when the displaying operation is resumed in the pause state. For example, such modification may be possible that the "appropriate frame image data" to be displayed when the pause manipulation is performed in the moving image displaying operation is the frame image data "A" which is shot just after the frame image data "B" displayed in the pause state, and the "appropriate frame image data" to be displayed when the displaying operation is resumed in the pause state is the frame image data "B" displayed just before the frame image data "A" displayed when the displaying operation is resumed in the pause state.

(03) In the above embodiments, the shooting operations are performed using two different exposure times, but plural exposure times (more than two exposure times) may be used for the shooting operation.

(04) In the above embodiments, when the moving image playback mode "A" is selected, plural pieces of frame image data obtained using the short exposure time are successively displayed, Modification may be made to the embodiments such that the moving image playback mode "A" can be switched to other the moving image playback mode (that is, to the moving image playback mode "B" or to the automatic selection playback mode) while the moving image is being displayed. In a similar manner, while the moving image is being displayed in the moving image playback mode "B" or in the automatic selection playback mode, the playback mode may be switched to other the moving image playback mode.

When it is necessary to display frame image data shot using a different exposure time in place of the frame image data displayed at the time the moving image playback mode is switched, plural pieces of frame image data shot using the different exposure time are successively displayed from the frame image data corresponding to the frame image data displayed most recently.

(05) In the above embodiments, plural pieces of frame image data obtained by the moving image shooting operation are recorded in a single image file. Point is that the plural pieces of frame image data are associated with each other for a recording purpose. It is not always necessary to record these plural pieces of frame image data in a single image file. In this case, the plural pieces of frame image data are associated and recorded with the track "A" or "B" where the index data is recorded.

(06) In the above embodiments, the index data of the frame image data shot using an exposure time is recorded in the track corresponding to such exposure time, but there is no need to separate the index data by the exposure time.

(07) In the above embodiments, the case is described, in which the moving image displaying operation is performed, but the frame image data may be used to display a still image.

(08) In the above embodiments, the digital camera according to the present invention is described, but the invention may be used for any apparatus which is capable of displaying an image. In the case of the apparatus being capable of displaying an image, an image file is obtained in accordance with the flow chart of FIG. 4, and operation is performed based on the obtained image file in accordance with the flow charts of FIGS. 8 and 9. The image file may be obtained from an external recording medium by CPU 10, or may be obtained through a communication line or radio communication network, or may be downloaded from the Internet.

(09) The above modifications (01) and (02) may be arbitrarily combined to the extent yielding no conflict.

(10) The embodiments of the invention and the modifications are described only to illustrate preferred embodiments of the inventions, for better understanding of the principle and structure of the invention, but by no means restrict the scope of the inventions defined in the accompanying claims.

Therefore, it should be understood that various sorts of alternations and modifications to be made to the above embodiments of the invention will fall within the scope of the invention and are protected under the accompanying claims.

In the above embodiments, the image pick-up apparatus of the invention which is used in the digital camera 1 is described, but the invention is not restricted to the invention used in the digital camera, and the invention may be used for any apparatus which is capable of displaying an image.

What is claimed is:

1. An image pick-up apparatus comprising:
   an image pick-up unit;
   a display;
   a shooting control unit which controls the image pick-up unit to shoot an object using a first exposure condition a plurality of times, and to shoot the object using a second exposure condition a plurality of times, wherein the second exposure condition is different from the first exposure condition;
   a recording control unit for recording the image data shot using the first exposure condition and moving image data including plural pieces of image data sequentially shot using the second exposure condition to a memory unit in association with each other;
   a display mode setting unit for setting one of a first display mode for displaying the image data shot using the first exposure condition, and a second display mode for playing the moving image data shot using the second exposure condition;
   a first display control unit for continuously displaying on the display a still image of the image data shot using the first exposure condition recorded in the memory unit, when the first display mode is set by the display mode setting unit, and for playing on the display the moving image data shot using the second exposure condition recorded in the memory unit, when the second display mode is set by the display mode setting unit; and
   an instruction detecting unit for detecting a frame advancing/retreating operation instruction when the first display mode is set by the display mode setting unit;
   wherein when the instruction detecting unit detects the frame advancing/retreating operation instruction in the first display mode, the first display control unit displays one of (i) a still image of image data that was shot using the first exposure condition just before the image data that is currently being displayed, and (ii) a still image of image data which was shot using the first exposure condition just after the image data that is currently being displayed.

2. The image pick-up apparatus according to claim 1, wherein the first exposure condition includes a first exposure time, and the second exposure condition includes a second exposure time, and the second exposure time is longer than the first exposure time.

3. The image pick-up apparatus according to claim 2, wherein the shooting control unit controls the image pick-up unit to shoot the object using the first exposure condition every predetermined period.

4. The image pick-up apparatus according to claim 1, wherein the memory unit records the image data shot using the first exposure condition and the moving image data shot using the second exposure condition in a single image file.

5. The image pick-up apparatus according to claim 1, further comprising:
   an index producing unit for producing index data corresponding to each piece of image data shot by the shooting control unit,
   wherein the recording control unit records the index data of the image data shot using the first exposure condition, to the memory unit in association with the image data, and the index data of the moving image data shot using the second exposure condition, to the memory unit in association with the moving image data.

6. The image pick-up apparatus according to claim 5, wherein the first display control unit further displays the index data associated with the image data displayed on the display unit.

7. The image pick-up apparatus according to claim 1, wherein the shooting control unit controls shooting using the first exposure condition or the second exposure condition according to the display mode set by the display setting unit; and
   wherein the apparatus further comprises a second display control unit which displays on the display unit in real time image data shot by the shooting control unit controlled according to the set display mode.

8. The image pick-up apparatus according to claim 1, wherein the continuously displayed still image data corresponds to the piece of the moving image data that was displayed when the display setting unit switched the set display mode from the second display mode to the first display mode; and wherein the first display control unit restarts the playing of the moving image data, from the piece of the moving image data that was displayed when the display setting unit switched the set display mode from the second display mode to the first display mode, when the display setting unit switches the set display mode back to the second display mode.

9. The image pick-up apparatus according to claim 1, wherein the shooting control unit controls the image pick-up unit to shoot the object using the first exposure condition a plurality of times.

10. The image pick-up apparatus according to claim 9, wherein the shooting, control unit controls the image pick-up unit to shoot the object using the first exposure condition and to shoot the object using the second exposure condition alternately.

11. An image playback apparatus comprising:

an obtaining unit for obtaining plural pieces of image data, in which image data obtained by a shooting operation which is performed using a first exposure condition plural times and moving image data including plural pieces of sequential image data obtained by a shooting operation which is performed using a second exposure condition plural times are associated with each other, wherein the second exposure condition is different from the first exposure condition;

a display mode setting unit for setting one of a first display mode for continuously displaying the image data obtained using the first exposure condition, and a second display mode for playing the moving image data obtained using the second exposure condition;

a display control unit for continuously displaying on a display a still image of the image data obtained using the first exposure condition, when the first display mode is set by the display mode setting unit, and for playing on the display the moving image data including the plural pieces of image data sequentially obtained using the second exposure condition, when the second display mode is set by the display mode setting unit; and an instruction detecting unit for detecting a frame advancing/retreating operation instruction when the first display mode is set by the display mode setting unit;

wherein when the instruction detecting unit detects the frame advancing/retreating operation instruction in the first display mode, the first display control unit displays one of (i) a still image of image data that was shot using the first exposure condition just before the image data that is currently being displayed, and (ii) a still image of image data which was shot using the first exposure condition just after the image data that is currently being displayed.

12. A method of controlling a displaying operation in an image playback apparatus, comprising:

obtaining plural pieces of image data, in which image data obtained by a shooting operation which is performed using a first exposure condition plural times and moving image data including plural pieces of sequential image data obtained by a shooting operation which is performed using a second exposure condition plural times are associated with each other, wherein the second exposure condition is different from the first exposure condition;

setting a first display mode for continuously displaying the image data obtained using the first exposure condition or a second display mode for playing the moving image data obtained using the second exposure condition;

continuously displaying on a display a still image of the image data obtained using the first exposure condition, when the first display mode is set, and playing on the display the moving image data including the plural pieces of image data sequentially obtained using the second exposure condition, when the second display mode is set; and detecting a frame advancing/retreating operation instruction when the first display mode is set;

wherein when the frame advancing/retreating operation instruction is detected in the first display mode, the display displays one of (i) a still image of image data that was shot using the first exposure condition just before the image data that is currently being displayed, and (ii) a still image of image data which was shot using the first exposure condition just after the image data that is currently being displayed.

13. A non-transitory computer readable recording medium having a program stored thereon that is executable by a computer of an image playback apparatus to perform functions comprising:

obtaining plural pieces of image data, in which image data obtained by a shooting operation which is performed using a first exposure condition plural times and moving image data including plural pieces of sequential image data obtained by a shooting operation which is performed using a second exposure condition plural times are associated with each other, wherein the second exposure condition is different from the first exposure condition;

setting a first display mode for continuously displaying the image data obtained using the first exposure condition or a second display mode for playing the moving image data obtained using the second exposure condition;

continuously displaying on a display a still image of the image data obtained using the first exposure condition, when the first display mode is set, and playing on the display the moving image data including the plural pieces of image data sequentially obtained using the second exposure condition, when the second display mode is set; and detecting a frame advancing/retreating operation instruction when the first display mode is set;

wherein when the frame advancing/retreating operation instruction is detected in the first display mode, the display displays one of (i) a still image of image data that was shot using the first exposure condition just before the image data that is currently being displayed, and (ii) a still image of image data which was shot using the first exposure condition just after the image data that is currently being displayed.

* * * * *